Oct. 9, 1945.  C. A. FRENCH  2,386,676
STERILIZING APPARATUS AND PROCESS
Filed Oct. 12, 1942  3 Sheets-Sheet 1
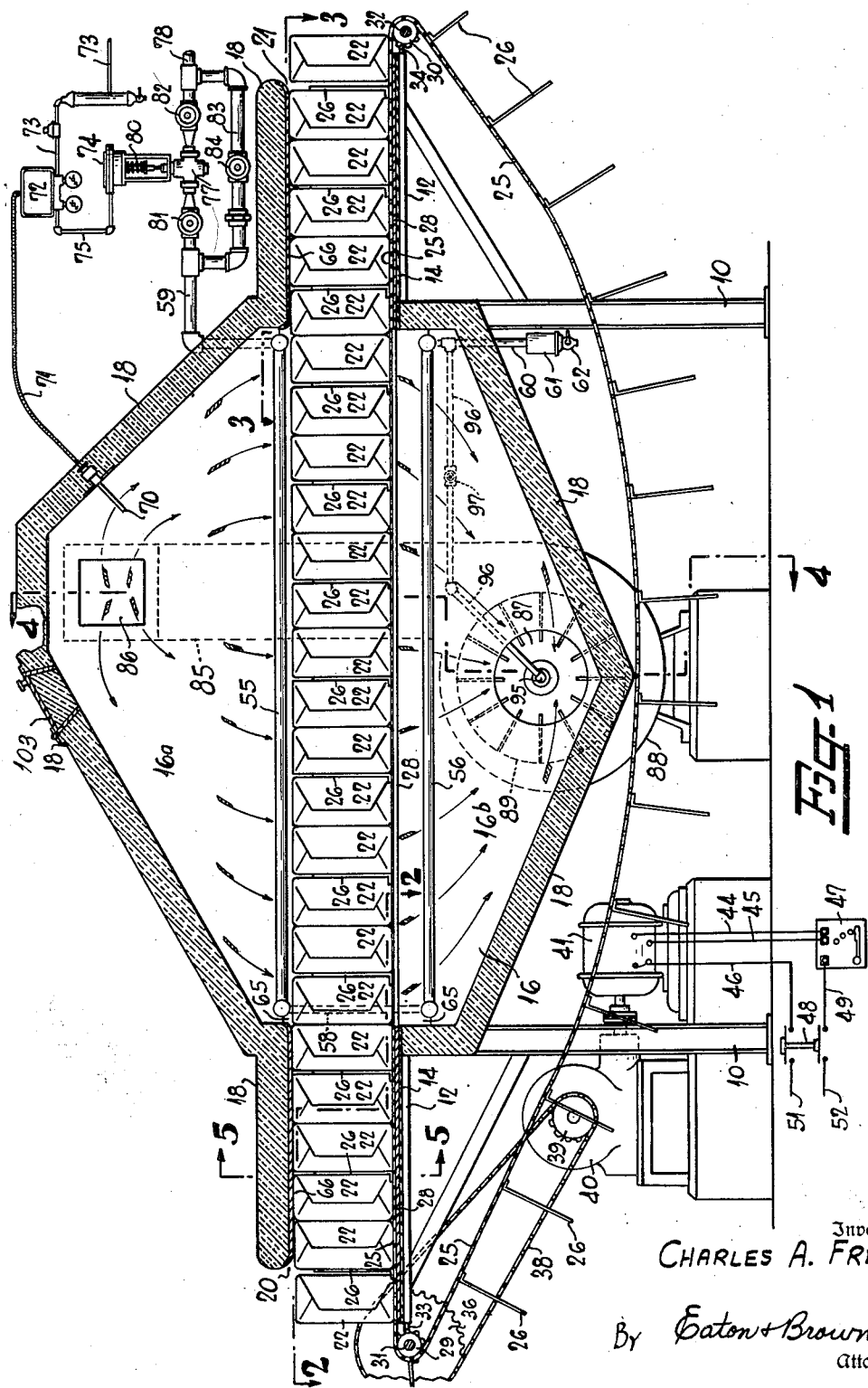
Inventor:
CHARLES A. FRENCH
By Eaton+Brown
Attorneys

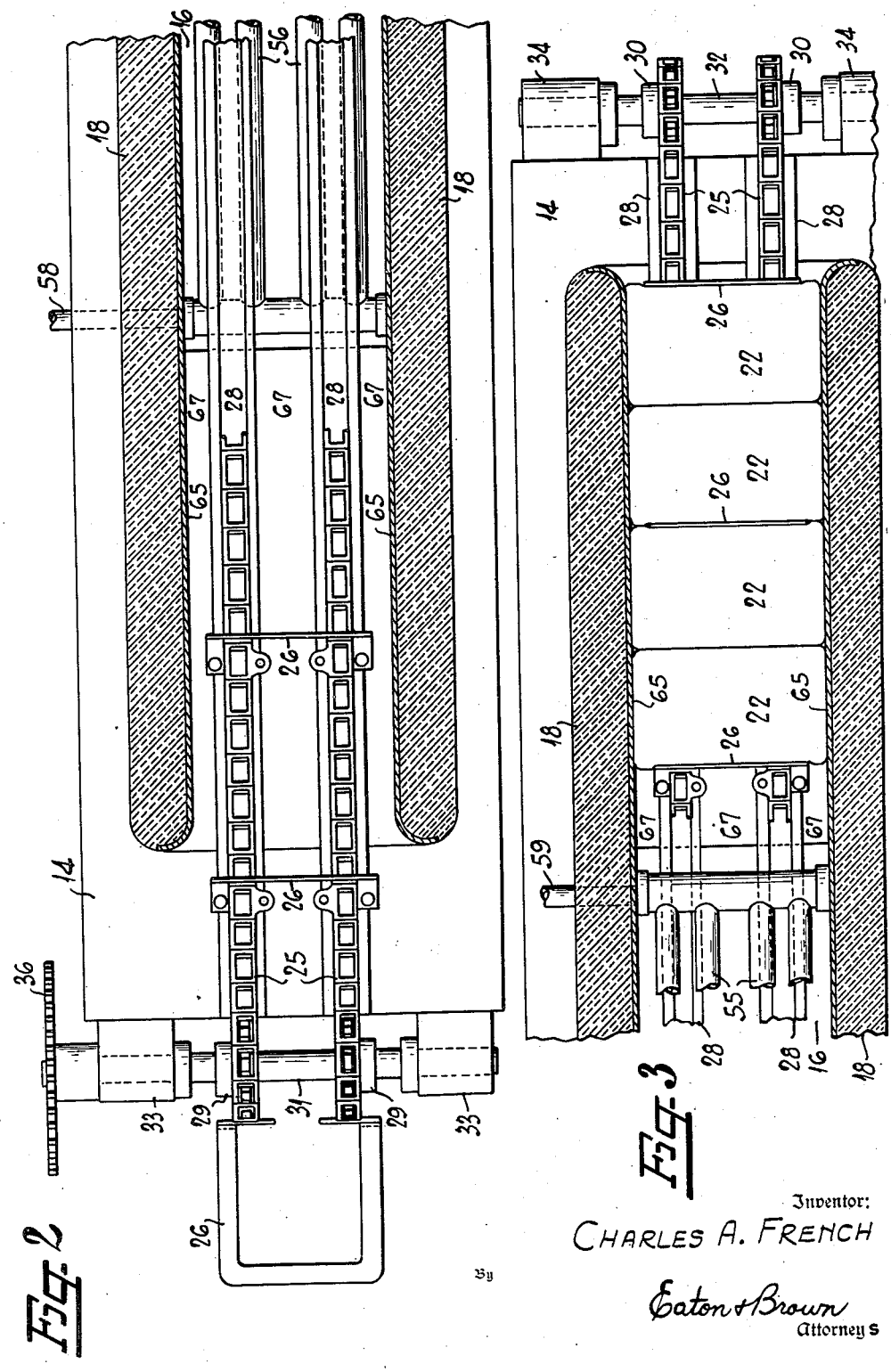

Oct. 9, 1945.  C. A. FRENCH  2,386,676
STERILIZING APPARATUS AND PROCESS
Filed Oct. 12, 1942   3 Sheets-Sheet 3
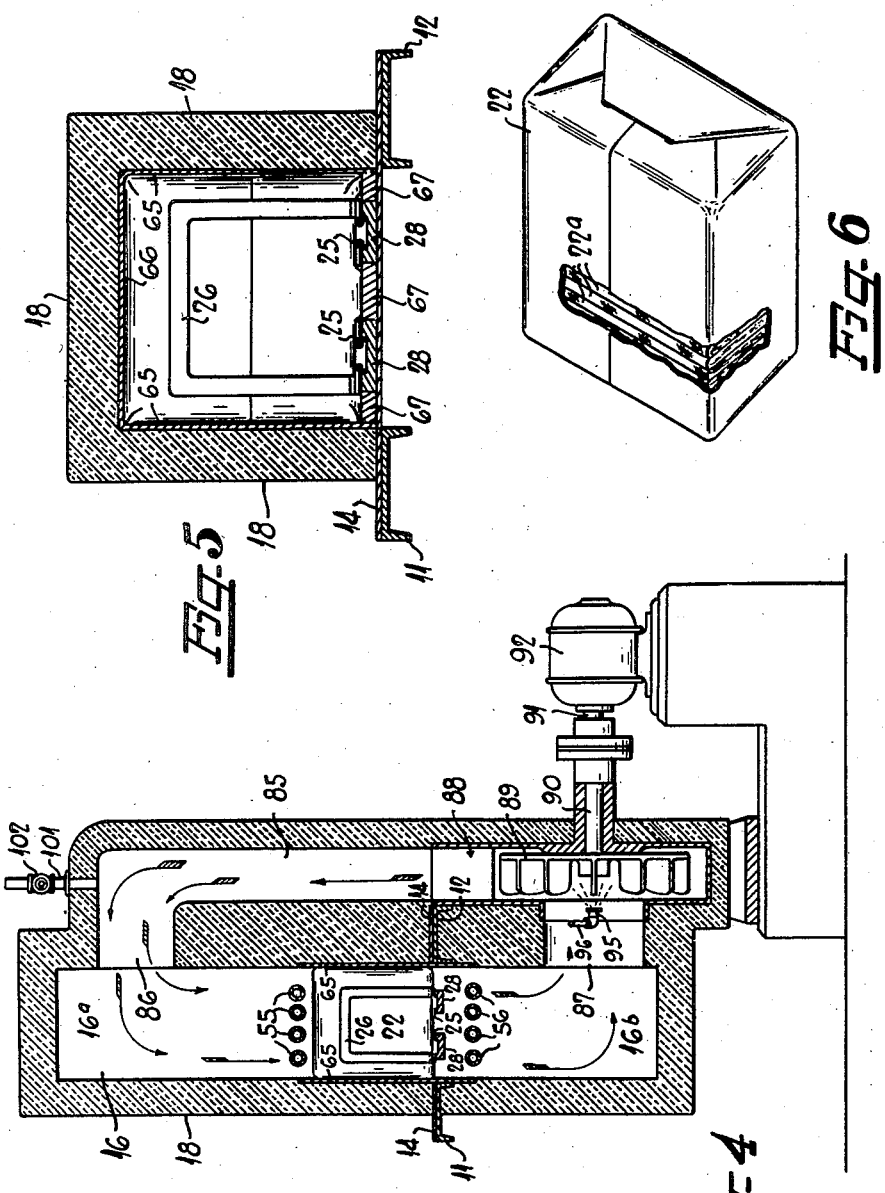
Inventor:
CHARLES A. FRENCH
By
Eaton+Brown
Attorneys Patented Oct. 9, 1945

2,386,676

UNITED STATES PATENT OFFICE 2,386,676

STERILIZING APPARATUS AND PROCESS

Charles A. French, Greenville, S. C.

Application October 12, 1942, Serial No. 461,821

4 Claims. (Cl. 21—56)

This invention relates to apparatus and process for continuously sterilizing packaged articles such as bandages, sanitary napkins, disposable diapers, and the like, and more especially to such an apparatus in association with a kinetic heat process.

Recent discoveries tend to substantiate the theory that germs have an impermeable shell which can be exploded by heat, in very much the same manner that corn is popped; consequently, the more quickly the temperature around the germ shell is raised, the quicker the explosion and destruction of the germ.

Heretofore, the same result has been accomplished by what is known as the static process, whereas this is the kinetic process. That static process usually comprises the admission of heat and steam, under pressure, into a closed retort in which the packaged articles have been previously placed. Then a vacuum is created in the retort, after which pressure is again applied. This process is repeated several times until the necessary heat penetration is obtained to explode the germs, and then the entire batch of packages is removed so that another batch of unsterilized packages can be placed therein for the next operation.

When employing the above-named static process, there is much difficulty in obtaining the proper heat penetration of the packages, because the pressure upon all sides of the packages is substantially the same, and therefore, after the packages are once heated, there will be very little heat flow. As a result, the static method of sterilization has proved to be slow and costly.

It is an object of this invention to provide a kinetic process of sterilization in which there is a pressure differential between opposed sides of the packaged articles to thus cause heated vapor to continuously pass therethrough and effect the desired sterilizing operation. This moving heated vapor constantly subjects the articles to a fresh supply of heat, and therefore, the sterilizing efficiency is very much increased over the old static method.

It is another object of this invention to provide a kinetic process of sterilization which is continuous as contrasted with the batch process. In the present process, the packages form a labyrinth in the entrance and discharge passages to prevent substantial loss of heat and steam from the pressure chamber, and therefore, the packages can continuously move through the pressure chamber. This labyrinth of packages also serves to divide the interior of the apparatus into two compartments so that a pressure differential between opposed sides of the packages is possible.

It is another object of this invention to provide an apparatus and process of the class described having means for automatically maintaining a predetermined supply of saturated steam in the heating coils, and also having means for circulating and recirculating the air and steam heated by said coils in the same general direction through articles to be sterilized.

Some of the objects of the invention having been stated, the other objects will appear as the description proceeds when taken in connection with the accompanying drawings in which:

Figure 1 is a longitudinal sectional view taken through my improved sterilizing apparatus;

Figure 2 is an enlarged sectional plan view taken along the line 2—2 in Figure 1, omitting the packages which are to be sterilized;

Figure 3 is a sectional plan view taken along the line 3—3 in Figure 1;

Figure 4 is a transverse vertical sectional view taken along the line 4—4 in Figure 1;

Figure 5 is a transverse vertical sectional view taken along the line 5—5 in Figure 1, said view illustrating the manner in which the packages to be sterilized seal the inlet opening to the sterilization compartment;

Figure 6 is an isometric view of a package to be sterilized, certain portions of the cover of said package being broken away to show the product disposed therein.

As heretofore stated, the present disclosure is especially designed for the sterilization of packaged goods such as disposable diapers, sanitary napkins, surgical bandages, and the like. Referring particularly to the drawings, the numerals 10 denote structural columns, the upper ends of which support longitudinal channels 11 and 12, said channels having a plate 14 disposed on the upper sides thereof. This plate extends substantially the entire length of the apparatus and has a rectangular opening in the intermediate portion thereof to provide a space for compartment 16. In other words, the rectangular cut-away portion in the plate 14 has a width substantially the same as the width of the compartment 16 (Figure 4) and a length the same as the length of the compartment. (Figure 1) Compartment 16 extends above and below the level of plate 14 and is surrounded by walls 18 which are made from insulation materials such as asbestos or the like, so as to retain the heat within the compartment.

The compartment 16 has inlet opening 20 and a discharge opening 21 through which the packages 22 of the material to be sterilized are adapted to successively pass. Likewise, the walls of the inlet and outlet ports are encased by insulation material 18. It will be noted by referring to Figures 1 and 5 that the size of the packages is substantially the same as the cross-sectional area of the inlet and outlet openings; consequently, when the packages are placed one against the other, and inserted within the openings, the openings are practically sealed, so that very little steam and heated vapor can escape from the compartment.

By observing Figure 1, it can be seen that the packages 22 are successively stacked one against the other to form a labyrinth. One end of this labyrinth of packages closes the inlet opening 20 and the other end of the labyrinth closes the discharge opening 21, whereas, the intermediate portion of the labyrinth of packages is disposed within the compartment 16 where the same is sterilized. These openings 20 and 21 are of sufficient length so that a plurality of packages can be placed therein. Obviously, the greater the length of each opening, the greater assurance there will be of a more complete seal to prevent the escape of steam, and heated vapor.

As a means for continuously moving the packages 22 through the compartment 16 during a sterilizing operation, it is desirable to provide some suitable means such as a conveyor belt. In the present instance, an endless link conveyor chain 25 is provided, said chain having spaced upstanding dogs 26 anchored thereto, between which packages 22 are inserted. The distance between each of the dogs 26 may be sufficient for one, two, three or more packages to be placed therebetween, dependent upon the size of the package and the nature of the operation. In the present installation, it has been found desirable to make the space between adjacent dogs sufficient for the accommodation of at least two packages.

The top portion of the chain successively passes through the inlet opening 20, the compartment 16, and the discharge opening 21. While passing through the above-named openings and compartment, the packages 22 are adapted to be positioned upon the chain in the manner shown in Figure 1. As a means for supporting the top portion of the chain 25 and packages 22 while passing through the inlet and discharge openings and through compartment 16, suitable grooved trackways 28 are provided, which extend substantially the entire length of the apparatus.

Chain 25 is mounted upon sprockets 29 and 30 on shafts 31 and 32 respectively, said shafts being rotatably mounted in brackets 33 and 34 respectively at opposed ends of the apparatus. Shaft 31 has a sprocket 36 fixedly mounted thereon, said sprocket, in turn, having a chain 38 mounted thereon, which chain is also mounted upon a sprocket 39, driven by a gear reducing unit 40. This gear reducing unit 40 is driven by a motor 41 in a conventional manner.

It is often necessary to intermittently advance the conveyor chain 25, together with the associated packages 22, through the compartment 16. A very satisfactory arrangement for providing this intermittent advancement is shown schematically in Figure 1. It is here seen that motor 41 has wires 44, 45, and 46 leading therefrom, which wires supply current to the motor. Wires 44 and 45 lead to a starting box 47, whereas wire 46 leads to one side of a switch 48. The box 47 has a wire 49 leading therefrom to the same side of switch 48 as wire 46. Wires 51 and 52 lead from the other side of switch 48, these wires 51 and 52 being a continuation of wires 46 and 49 respectively previously described.

It is preferable to construct switch 48 so that it will remain normally open. Therefore, when it is desired to advance the packages through the compartment, it is only necessary to apply pressure to the switch for the length of time that the packages should be moving. Of course, other means could be provided for advancing these packages at a uniform rate so that each package would be subjected to the heated vapors within the compartment for sufficient length of time to effect proper sterilization.

In the present embodiment of the invention, suitable steam coils 55 and 56 are disposed within compartment 16, above and below respectively, a labyrinth of packages 22. If desired, both coils may be located either above or below the labyrinth of packages. These coils are connected by a pipe 58, and are supplied with saturated steam under a pressure of 120 pounds or more by a pipe 59. Leading from the lowermost coil 56 is a pipe 60, which leads to a condensation trap 61 for collecting the condensation which accumulates in the coils. After the condensation has accumulated in the trap, it is drained therefrom through a valve 62.

The labyrinth of packages 22, while passing through the chamber 16, subdivides this chamber into an upper compartment 16a and a lower compartment 16b. These compartments are substantially the same width as the packages which fit therebetween; consequently, the flow of steam and heated vapor is retarded by the packages. It is also seen by referring to Figure 4 that a portion of the opposed side walls of the compartment 16 are lined with a smooth material such as steel plate 65, so that the ends of the packages will easily slide through the apparatus, and at the same time maintain a more complete seal between the upper and lower compartments. In a like manner, the inlet and discharge openings 20 and 21 have the sidewalls lined with these same plates 65. The top or ceiling of each opening 20 and 21 is lined with a smooth plate 66, whereas, the bottoms of these openings are lined with trackways 28 and intermediate filler plates 67. By so lining the compartment 16 and the inlet and outlet openings 20 and 21, the packages 22 will always contact a smooth surface while moving through the apparatus.

Since it is usually desirable to maintain a slightly higher temperature in the upper compartment 16a, the saturated steam is first introduced into the upper set of coils 55, and then the steam flows through pipe 58 into the lower coil 56. The steam gradually cools and therefore condensate will accumulate. This condensate will flow through pipe 60 into the trap 61, from whence it is removed by way of drain valve 62.

The upper right-hand portion of Figure 1 shows a typical installation diagram of a single action controller which automatically maintains an even temperature between certain limits within the compartment 16a. When the temperature falls, additional steam is admitted into the upper coils 55 by the above-named control mechanism. This mechanism comprises a bulb 70 which is disposed within the upper compartment 16a. The temperature in the compartment heats the bulb 70, which, in turn, transmits the corresponding gas or vapor pressure through a tubing 71 to a control box.

This control box is conventional, and therefore the mechanism therein will not be described in detail, but it should be noted that the mechanism in the box 72 is supplied with air through a pipe 73 and this air is admitted to diaphragm motor 74 by the mechanism through another pipe 75, when the temperature drops, and it is necessary to add steam. Diaphragm motor 74, when expanded, opens valve 77 to admit steam to pipe 59 and coils 55 and 56. When the control temperature is reached, the air in diaphragm motor 74 is exhausted to allow spring 80 to close valve 77 to thereby stop the flow of steam to the coils.

Conventional valves 81 and 82 are provided and these valves are closed when it is desired to eliminate the diaphragm motor 74 and automatic control. When the automatic feature is eliminated, the saturated steam from pipe 78 is by-passed around valve 77 and through a pipe 83. This pipe 83 has a valve 84 therein which is closed when the automatic controls are in operation. Although the temperatures may vary with the type of operation which is being effected, it has been found that a satisfactory sterilization heat of about 270° F. should be present in the compartment 16a when sterilizing sanitary napkins, surgical bandages, and the like.

One of the important features of the present invention resides in maintaining a different pressure in compartment 16a from compartment 16b. The pressure in compartment 16a should be somewhat greater than that of compartment 16b so that the heated vapor and steam within the upper compartment will readily pass through the labyrinth of packages 22 and into the lower compartment. As in the case of the temperature, the amount of pressure is also a variable factor depending upon the amount of resistance to the flow of heated steam and vapor offered by the material which is being sterilized, and also depending upon the rate for the heated steam and vapor to move through the packages. In most instances, only a few ounces pressure are necessary in the upper compartment, whereas, a few ounces of vacuum is desired in the lower compartment. In many instances a pressure of about five ounces in the upper compartment 16a and a vacuum of about four ounces in the lower compartment 16b has been found satisfactory for sterilization of sanitary napkins, disposable diapers, and the like.

In order to create this pressure differential between the opposed sides of packages 22 while within the compartment, a suitable conduit 85 has been provided (Figure 4) said conduit having its upper end communicating with the upper compartment 16a as at 86, and its lower end communicating with the lower compartment 16b as at 87. A suitable suction and blower fan 88 is disposed in conduit 85, said fan having an impeller 89 disposed therein which draws heated vapor, steam, and the like from the lower compartment, and forces it upwardly into the upper compartment. The impeller 89 is fixedly mounted upon a shaft 90, and this shaft is coupled to a second shaft 91 extending from motor 92. When in operation the steam and heated vapor are circulated and recirculated (Figures 1 and 4) in the same general direction downwardly over coils 55, through packages 22, over lower coils 56, and into the conduit 85, thereby providing a moving wave of heated vapor and moisture through the packages 22 when a sterilization operation is being carried out.

In many instances, it is desirable to add humidity to the heated vapor which is being circulated within this apparatus. It has been found that saturated steam is very satisfactory for this purpose, therefore a nozzle 95 has been located at the intake end of the fan 88, said nozzle having a pipe 96 leading therefrom to the pipe 60 previously described. A valve 97 is provided in the pipe 96 for controlling the amount of steam admitted into the intake end of the fan 88. In some instances, the entire steam supply may be cut off. This saturated steam is forced upwardly through the conduit by the impeller 89 along with the currents of heated vapor and thus serves to render the cover of the package 22 more penetrable. This cover of the package is preferably made from some porous material which will permit a limited amount of heated vapor and steam to readily pass therethrough.

It is seen in Figure 6 that the package has a plurality of bandages or sanitary napkins 22a packed therein in parallel relation to each other. When the packages are positioned upon conveyor chain 25 and in the compartment, the individual bandages 22a have their longitudinal axes substantially parallel to the line of travel of the heated air and steam currents.

If desired, a suitable vent may be provided so that the excess moisture can be exhausted from the compartment 16 as it accumulates. In this installation, a vent pipe 101 is provided in the conduit 85 near the discharge of the fan 88 (Figure 4). The vent pipe has a hand valve 102 therein, which controls the exhaust of moisture.

Steam in coils 55 and 56 is superheated and at a pressure of 125 pounds or more which corresponds to a temperature of 353° and the condensation of this steam is the heating means. This steam when admitted through nozzle 95 into the fan immediately expands and theoretically comes down to a temperature of 212° (of course, it will not come down to that temperature if the circumambient atmosphere is at a temperature higher than 212°). This steam then becomes superheated in contact with the coils. Probably in operation the temperature below the packages is, say, 260° and the steam expanding through nozzle 95 will bring that temperature down somewhat, then the whole mass becomes further superheated up to, say, 270° in contact with coil 55. Practically, these coils may be either above or below the packages as heretofore mentioned in the specification. As superheated steam has approximately twice the specific heat of air and is much lighter and easier to move than air, it should be the sole medium of sterilization. On pages 3–19 Kent Mechanical Engineers Handbook, 11th Edition states that the specific heat of air at 68–824° F. is .2366 while that of water vapor at 356° F. is 51. As, after the apparatus is in operation two or three minutes, the air is usually expelled as it is ordinarily heated up with the intake or outlet end open, so that air may pass out.

A door 103 is provided for venting air from the chamber 16 while starting.

In the drawings and specification, there has been set forth a preferred embodiment of the invention and although specific terms are employed, they are used in a generic and descriptive sense only and not for purposes of limitation, the scope of the invention being defined in the claims.

I claim:

1. That method of sterilizing porous packages which comprises moving the packages in a continuous stream through a compartment, shielding the sides of the packages and forcing a sterilizing fluid through the exposed ends of the packages and through the contents of the packages and out through the other exposed ends of the packages.

2. That method of sterilizing porous packages which comprises passing the packages in a continuous stream through a compartment having inlet and outlet ports, shielding the sides of the packages against contact with a treating fluid, and forcing a treating fluid through the packages from one compartment to another as they pass through the passageway.

3. Apparatus for continuously sterilizing articles such as bandages, sanitary napkins, and the like, comprising a casing formed to provide a passageway having an enlarged intermediate portion and having inlet and outlet ports communicating therewith and of uniform cross-section from end to end and of substantially the same width as said intermediate portion, the cross-section of each port being the same as that of the other port, an endless conveyor arranged to carry through said ports and said intermediate portion packages having such contour as to snugly fit and substantially prevent the escape of vapors from said ports and to maintain such packages in such position as to divide the intermediate portion into two chamber portions, a conduit structure arranged to conduct superheated steam in heat exchange relation with packages traversing the intermediate portion of the passageway and discharge steam in the form of saturated vapor into the passageway, means for forcing the saturated steam to travel from one of said chamber portions to the other portion through the packages traversing the intermediate portion of the passageway.

4. Apparatus for sterilizing porous articles such as sanitary napkins, surgical dressings, and the like comprising a casing having a compartment, said casing having alined inlet and outlet ports, a conveyor mounted in the ports and extending through the casing, a pair of side plates extending from the sidewalls of one port to the other port, a conveyor mounted in the ports and bridging the space therebetween and adapted to be filled with articles of such size and contour as to fit against the sideplates and to substantially close the ports, a conduit system connecting the lower part of the compartment with the upper part of the compartment, means for heating the interior of the compartment, circulatory means in the conduit system for forcing a disinfecting fluid out of one part of the compartment into the other part of the compartment and through the articles disposed on the conveyor between the two parts of the compartment.

CHARLES A. FRENCH.